(12) United States Patent
McLean et al.

(10) Patent No.: US 8,347,300 B2
(45) Date of Patent: Jan. 1, 2013

(54) MANAGING RESOURCE LEASE DURATION USING A LEASE MODIFIER AS A FUNCTION OF RESOURCE UTILIZATION METRIC AND INITIAL DECAY RATE VALUE FOR ON-DEMAND COMPUTING

(75) Inventors: Adam McLean, Ontario (CA); Jason Smith, Ontario (CA); Adam Borg, Ontario (CA); Steven Langridge, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 12/020,448

(22) Filed: Jan. 25, 2008

(65) Prior Publication Data

US 2009/0193425 A1    Jul. 30, 2009

(51) Int. Cl.
*G06F 9/50*    (2006.01)
(52) U.S. Cl. .................................. 718/104; 707/999.01
(58) Field of Classification Search .................. 718/104; 707/999.01
See application file for complete search history.

(56) References Cited

U.S. PATENT DOCUMENTS

| 5,838,968 | A * | 11/1998 | Culbert ........................ 718/104 |
| 6,237,009 | B1 * | 5/2001 | Waldo et al. ........................ 1/1 |
| 6,519,615 | B1 * | 2/2003 | Wollrath et al. ...................... 1/1 |
| 6,950,874 | B2 * | 9/2005 | Chang et al. .................. 709/229 |
| 7,260,543 | B1 * | 8/2007 | Saulpaugh et al. ........... 705/307 |
| 7,650,514 | B2 * | 1/2010 | Howell et al. ................ 713/193 |
| 2002/0166117 | A1 * | 11/2002 | Abrams et al. ............... 717/177 |
| 2002/0194251 | A1 * | 12/2002 | Richter et al. ................ 709/105 |
| 2005/0228856 | A1 * | 10/2005 | Swildens et al. ............. 709/200 |
| 2007/0022425 | A1 * | 1/2007 | Jackson ........................ 718/104 |

* cited by examiner

*Primary Examiner* — Jennifer To
*Assistant Examiner* — Abu Z Ghaffari
(74) *Attorney, Agent, or Firm* — Novak Druce + Quigg LLP

(57) ABSTRACT

A method and system of managing resource lease duration for on-demand computing is provided. The system can include one or more resources having a metric capturing tool; and a provisioning manager in communication with the one or more resources. The provisioning manager can receive a request for at least one resource from the requester. The provisioning manager can provision the at least one resource from the one or more resources. The metric capturing tool can communicate one or more metrics associated with performance of the at least one resource to the provisioning manager. The provisioning manager can determine a lease modifier based at least in part on the one or more metrics. The provisioning manager can adjust a lease duration for the at least one resource based at least in part on the lease modifier.

18 Claims, 3 Drawing Sheets

MANAGING RESOURCE LEASE DURATION USING A LEASE MODIFIER AS A FUNCTION OF RESOURCE UTILIZATION METRIC AND INITIAL DECAY RATE VALUE FOR ON-DEMAND COMPUTING

FIELD OF THE INVENTION

The invention relates to on-demand computing, and particularly to managing resource lease duration for on-demand computing.

BACKGROUND OF THE INVENTION

Computer technology requirements typically vary, especially over extended periods of time. Hard drive capacities, bus speeds, and processor speeds can double every few years. A user can require 10 gigabytes (GB) of storage capacity at the start of a business, which soon increases to a requirement of 1000 GB of storage when the business becomes successful. These varying demands have led in part to the use of on-demand computing.

On-demand or utility computing is a computing system or model that allocates computing resources or assets to an organization and its individual users on an as-needed basis to allow the organization to efficiently meet dynamic computing demands. For example, if a group of users is working with applications that demand a large amount of bandwidth, the on-demand computing system can allocate additional bandwidth specifically to this group, such as from a pool of resources that are not currently utilizing the bandwidth.

On-demand computing can provide for the packaging of the computing resources, such as computation and storage, as a metered service similar to a physical public utility. On-demand computing has the advantage of low initial cost to acquire hardware. Customers requiring very large computations or having a sudden peak in demand can also avoid the delays that would result from physically acquiring, assembling and/or implementing a large number of computer resources. For example, Internet hosting services have the capability to quickly arrange for the leasing of individual servers, such as to provision a bank of web servers to accommodate a sudden surge in traffic to a web site.

When resources are provisioned for use by an end-user, they are provided to the end-user for a length of time dictated by a lease duration. Typically, the lease duration requested is longer than the resource is actually required. This drives up inefficiencies in the use of the asset.

A need exists for efficient use of resources in an on-demand computing system. A need further exists for managing the lease duration associated with the resources based at least in part on metrics or parameters associated with the resources. A need yet further exists for managing the lease duration so that under-utilized assets are returned from lease faster and/or highly-utilized assets are provided with a longer lease.

SUMMARY OF THE INVENTION

One embodiment is an on-demand computing system. Exemplary embodiments can provide for efficient use of resources in an on-demand computing system. The system can manage the lease duration of the resources based at least in part on metrics or parameters associated with the resources. The lease durations can be set or adjusted so that under-utilized assets are returned from lease faster and/or highly-utilized assets are given a longer lease.

In one exemplary embodiment, there is provided a method of provisioning resources in an on-demand computing system. The method can include obtaining a request for a resource; provisioning the resource; monitoring metrics associated with the resource; determining a lease modifier based at least in part on one or more of the metrics; and adjusting a lease duration for the resource based at least in part on the lease modifier.

In another exemplary embodiment, there is provided a system for providing on-demand computing to a requester. The system can include one or more resources having a metric capturing tool; and a provisioning manager in communication with the one or more resources. The provisioning manager can receive a request for at least one resource from the requestor. The provisioning manager can provision the one or more resources. The metric capturing tool can communicate one or more metrics associated with performance of the resource to the provisioning manager. The provisioning manager can determine a lease modifier based at least in part on the one or more metrics. The provisioning manager can adjust a lease duration for the at least one resource based at least in part on the lease modifier.

In another exemplary embodiment, there is provided a computer-readable storage medium in which computer-executable code is stored. The computer-executable code is configured to cause a computing device in which the computer-readable storage medium is loaded to execute the steps of: obtaining a request for a resource; monitoring metrics associated with the resource after the resource is provisioned; obtaining a decay interval for the resource; averaging the metrics over the decay interval to determine metric averages; determining a lease modifier based at least in part on one or more of the metric averages; and adjusting a lease duration for the resource based at least in part on the lease modifier.

BRIEF DESCRIPTION OF THE DRAWINGS

Exemplary embodiments of the on-demand computing method and system will now be described, by way of example only, with reference to the accompanying drawings, in which.

DETAILED DESCRIPTION

Figure 2:
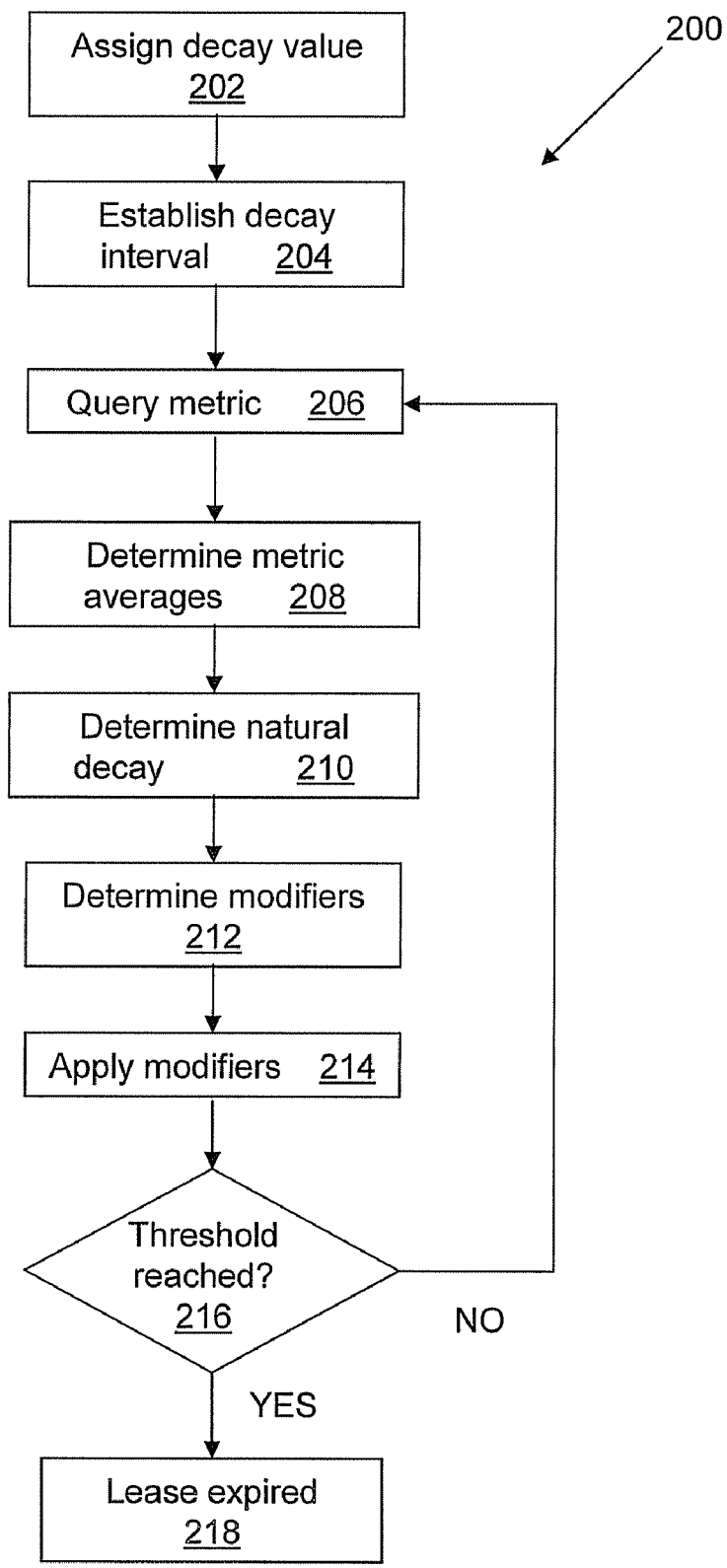
FIG. 2 is a flow chart illustrating a method of determining a lease duration for the resource distribution utilizing the system of FIG. 1.
Figure 3:
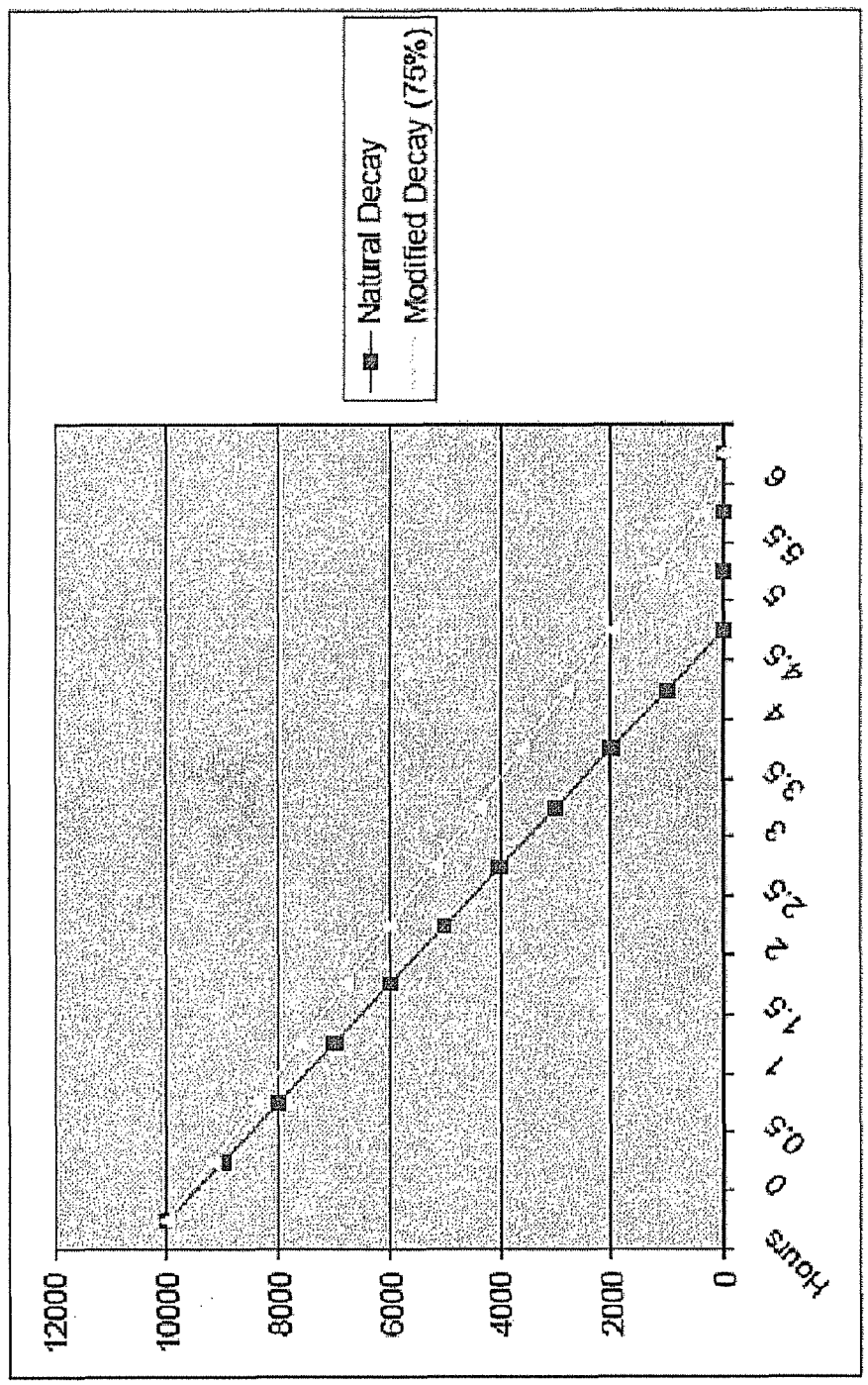
FIG. 3 is a graphical illustration of an exemplary embodiment of the determination of a lease duration according to the system and method of FIGS. 1 and 2.

The present disclosure, embodied in various examples, is directed to a method and system for managing resources or assets from a pool or cluster of resources or assets. The method and system can determine a lease duration for one or more of the resources to increase utilization efficiency for the resources and/or achieve other goals associated with the provisioning activity, such as power consumption efficiency. Exemplary embodiments will be explained in connection with various possible on-demand computing methods and systems. The detailed description is intended only to be exemplary. Exemplary embodiments are shown in FIGS. 1-3, but the present disclosure is not limited to the illustrated structure or application.

Figure 1:
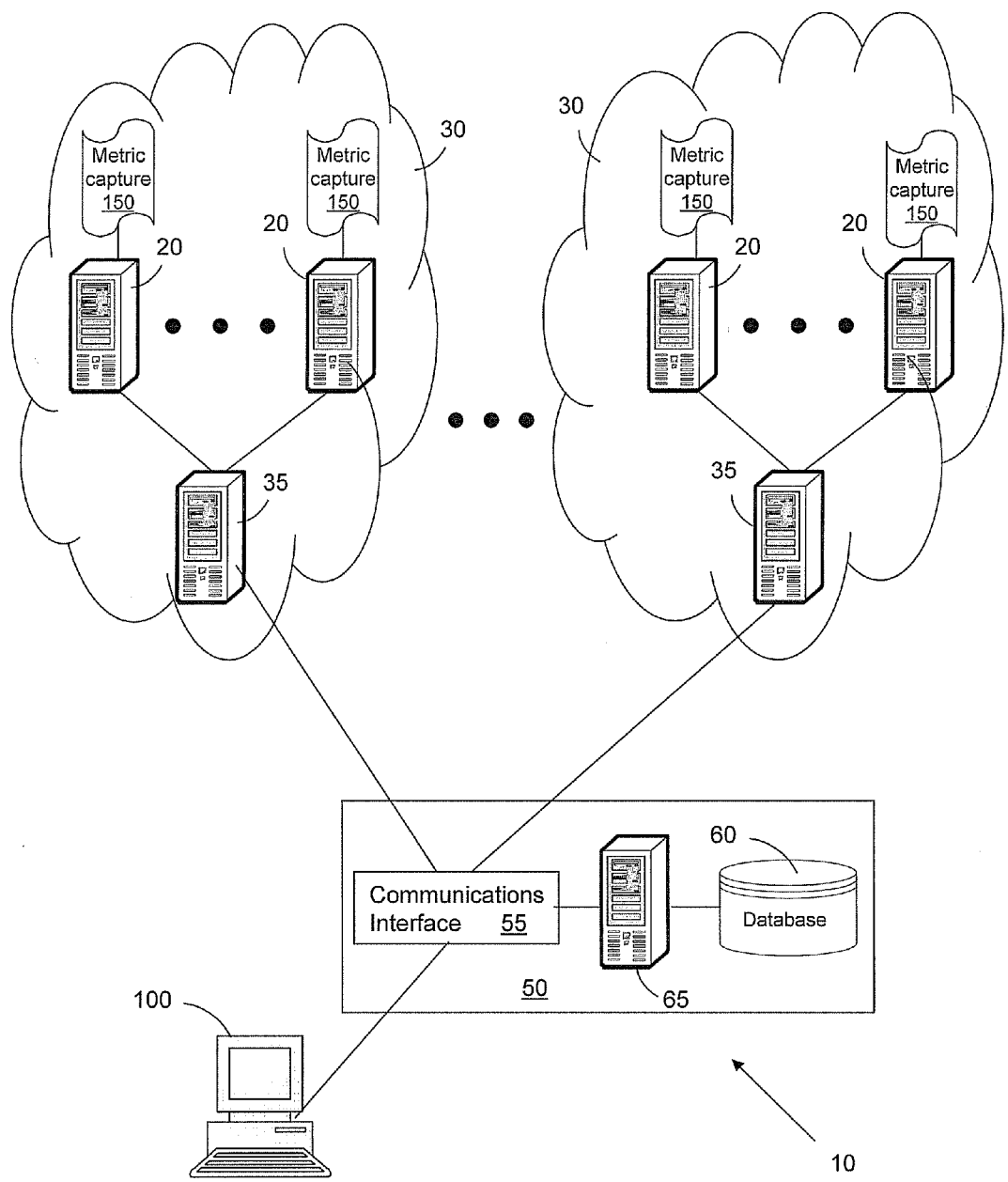
FIG. 1 is a schematic representation of an on-demand computing system according to an exemplary embodiment of the invention.

Referring to FIG. 1, an exemplary embodiment of an on-demand computing system according to aspects of the invention, is shown and generally represented by reference numeral 10. The system 10 can include one or more resources or assets 20 that are grouped into one or more pools or clusters 30. The particular type, number and configuration of the resources 20 can vary. For example, the resources 20 can be similar hardware, such as servers, as well as other devices including storage devices, routers, multiplexers, gateways, and so forth. The resources 20 of the system 10 are not limited to hardware, and can include bandwidth, specialized tasks, such as web services, and use of desired applications and/or operating systems. For example, the resources 20 can include processors that run Advanced Interactive eXecutive (AIX®) operating systems. The resources 20 can also be combinations of hardware and software.

The number and configuration of the resource pools 30 can also vary. For example, the system 10 can include a single resource pool 30 having multiple resources 20 or the system 10 can include multiple pools having the resources. In one embodiment, one or more of the pools 30 can have a single resource 20. A pool 30 can comprise a group of resources 20 that share a common trait. In one embodiment, the common trait can be the owner. The present disclosure also contemplates one or more other common traits being utilized for designation of the resources 20 to a pool 30, as well as a pool comprising resources without any common traits. The pools 30 can be located in proximity to each other, such as in a single facility, and/or can be geographically remote from each other.

The system 10 can include virtualization so that the available amount of the resources 20, such as storage or computing power, is larger than that of a single time-sharing computer. Multiple servers can be used on the back end to enable virtualization, such as a dedicated computer cluster or an under-utilized supercomputer. The system 10 can also include distributed computing where a single algorithm or calculation is run on multiple resources 20. The distributed computing can include grid computing where the supporting nodes are geographically distributed or where the nodes cross administrative domains. The present disclosure also contemplates the system 10 including a central server dispensing tasks to participating nodes at the request of approved end-users (e.g., paying customers). The system 10 can also be more de-centralized, such as a virtual organization, with organizations buying and selling the resources 20 as needed or as they go idle.

Distribution of the resources 20 to a requestor or user 100 can be performed by a provisioning manager or network proxy 50. An example of a suitable provisioning manager 50 is the Tivoli® Provisioning Manager from IBM® that can enable on-demand computing through software, server, storage and network automation. The present disclosure contemplates other devices and applications being used for the provisioning manager 50.

The provisioning manager 50 can include a communications interface 55 that utilizes common technology for communicating with the requestor 100, such as over a network including the Internet. By way of the communications interface 55, the provisioning manager 50 can direct by common means access to, and distribution of, one or more selected resources 20 from one or more pools 30. Provisioning manager 50 can further include a memory 60 (such as a high capacity storage medium) embodied in this illustration as a database, and a controller 65 that makes use of computing technology, such as a desktop computer or scalable server, for controlling operations of the provisioning manager.

In one embodiment, the memory 60 of the provisioning manager 50 can include metrics, information or parameters associated with the resources 20 of the pools 30, as described more particularly below. The provisioning manager 50 can communicate with the one or more pools 30 through a pool server 35. The server 35 can be used by a pool owner to retrieve, communicate and/or store the metrics associated with the resources 20. The present disclosure also contemplates the provisioning manager 50 communicating directly with one or more of the resources 20 without the use of the pool server 35. A combination of the direct communication with one or more resources 20 and the communication via the pool server 35 can also be utilized by system 10. In one embodiment, it can be determined by the pool owner, the provisioning manager 50 and/or the requester 100 whether the server 35 is used for communication with the resources 20 or whether direct communication is utilized.

In another embodiment, the requestor 100 can communicate directly with the server 35 without the use of the provisioning manager 50. The server 35 can include a communications interface that utilizes common technology for communicating with the requestor 100, such as over a network, including the Internet. Through use of a controller and a memory, the server 35 can direct the access to, and the distribution of, one or more selected resources 20 from the pool 30 to the requester 100.

The metrics or parameters associated with the resource 20 being leased can be monitored by the provisioning manager 50. The metrics can be captured by monitoring software or a metric capturing tool 150 installed on each of the resources 20, such as a Tivoli® monitoring tool from IBM® that can monitor and manage system and network applications on a variety of operating systems, track the availability and performance of the system, and provide reports to track trends and troubleshoot problems. The metric capturing tool 150 can communicate the metrics to the provisioning manager 50, such as in response to a query from the provisioning manager and/or in accordance with a pre-determined schedule.

In another embodiment, a separate device (not shown) can be operably coupled to one or more of the resources 20 for capturing the metrics associated with the resources. In yet another embodiment, the metric capturing tool 150 can be run on the pool server 35 which can query or otherwise obtain the metrics from each of the resources 20 of the pool 30. The particular configuration and technique utilized for capturing and communicating the metrics associated with each of the resources 20 can be varied based upon a number of factors, including the type of metric, the configuration of the resources within the pool 30, and the resource being monitored. For example, if the metric pertains to network traffic or load associated with the resource 20, then other components, such as a router associated with the resource, can be utilized for retrieving the metric. The type of parameters or metrics associated with the leased resource 20 that is being monitored can vary. For example, Central Processing Unit (CPU) utilization, memory utilization, and disk I/O utilization can be the monitored metrics.

Referring additionally to FIG. 2, the system 10 can utilize a lease duration method or process 200 to determine the length of time that one or more resources 20 are to be provisioned to and used by an end-user or other customer. The method 200 can be carried out by the provisioning manager 50, the server 35, the requester 100 or another entity. The present disclosure is not intended to be limited by the device or system carrying out the method 200. The method 200 is described herein with respect to a single heterogeneous pool 30 having a plurality of hardware resources 20, but other configurations can be used, and the present disclosure can be applicable to leases of single resources that are not part of a pool.

The method 200 can begin with a step 202 in which an initial decay value is assigned to the asset when it is first made available or otherwise provisioned at the start of the lease. In one embodiment, the initial decay values can be assigned for all resources of the pool 30 after the resources have their operating systems provisioned. While the exemplary embodiment describes the initial decay value as being an arbitrary number, the present disclosure contemplates the initial decay value being a non-arbitrary number. For example, resources of a certain type may receive particular initial decay values or an initial decay value within a particular range. In step 204, a decay interval can be established. The decay interval is the frequency of decaying or otherwise adjusting of the resource's decay value. For instance, the decay interval can be the frequency that a process or application will wake-up or otherwise be actuated to decay a resource's decay value.

In step 206, the metrics or other performance data for the leased resource can be queried or otherwise obtained. Metrics, such as the CPU utilization, the memory utilization and the disk I/O utilization, can be monitored by the metrics capturing tool 150 at various intervals, which can correspond to the querying intervals or be different therefrom. For example, the metrics can be captured from the resource 20 by the metric capturing tool 150 continuously or near continuously, while the querying interval is over a larger time span, such as every five minutes. Metric averages can be determined over the decay interval based upon the queried data, as in step 208.

In step 210, the natural decay rate can be determined. The natural decay rate is the rate at which the resource's decay value will be reduced or decay during the decay interval if it has no modifiers applied. Modifiers can then be determined in step 212 based on the metric averages for that decay interval. In step 214, the modifiers can be applied against the natural decay rate, which will either accelerate, decelerate, or maintain the current rate of decay for the resource. When a threshold value, such as a decay reclamation value, has been reached in step 216, the lease will be expired and further access can be denied to the end user, as in step 218. The decay reclamation value can be zero, but other values are also contemplated by the present disclosure. The difference between the actual lease time can be greater than, equal to, or less then the requested lease time depending upon the configured modifiers and the steps of the method 200.

As an example, the method 200 can be employed to drive up utilization of leased resources to a 50% goal. For instance, an initial decay value of 10,000.00 can be chosen with a decay interval of 30 minutes. To achieve the utilization goal, utilization of 50% disk I/O, 50% memory, or 50% CPU can be sought for the particular resource. Based on these goals, performance modifiers can be chosen such as using the following performance points shown in TABLE 1:

TABLE 1

| Percent Utilization | Modifier |
|---|---|
| 0% | 1.5 |
| 25% | 1.2 |
| 50% | 1.0 |
| 75% | 0.8 |
| 100% | 0.5 |

The percent utilization can be an average of three performance points taken from the monitoring framework, i.e., the metric capture tool 150, although any number can be used. Since the goal is to achieve a 50% utilization, any resource that is utilized to the 50% level can be naturally decayed. The resources 20 that are used more aggressively can have their lease duration extended to finish their work. The resources 20 that are under-utilized can have their duration shortened so they are returned faster, in order to service other provision requests earlier to further drive up the overall utilization of the resource or pool.

For this example, the end-user has requested a five hour lease duration for the resource. After the resource has been provisioned to the end-user, the decay process can commence. The first decay interval for this example will occur 30 minutes after the initial provisioning. A process will wake up and calculate the natural decay, query the performance metrics for the interval (such as a performance database associated with the pool 30 from which the resource 20 was provisioned), modify the natural decay, and then modify the initial decay value.

The natural decay can be calculated as follows:

$$(\text{Initial Decay value}) \Big/ \frac{(\text{Lease Duration in minutes})}{(\text{Decay Interval in minutes})}$$

In this example, the natural decay is calculated as:

$$(10000.00) \Big/ \frac{(300)}{(30)} = (10000.00)/(10) = 1000.00$$

This results in the natural decay per interval being 1000.00. The performance database or other metrics source can now be queried for the key metrics over the given decay interval. In this example, the I/O, memory, and CPU utilization are the important metrics. If three snapshots of each metric over the decay interval are gathered, then an average of those three snapshots can be determined. The highest value of these three metric averages can be chosen and used for determining which modifier is to be applied to the natural decay. For example, the following snapshots of the resource metrics can be retrieved and averages can be determined as shown in TABLE 2:

TABLE 2

| CPU sample 1: 59% | I/O Sample 1: 5% | Mem Sample 1: 28% |
|---|---|---|
| CPU sample 2: 79% | I/O Sample 2: 9% | Mem Sample 2: 30% |
| CPU sample 3: 92% | I/O Sample 3: 12% | Mem Sample 3: 30% |
| CPU Avg: 76.6% | I/O Avg: 8.6% | Mem Avg: 29.3% |

The highest metric value for this example is 76.6% utilization for the CPU metric. This value can then be used as the basis for choosing the modifier. Referring back to the modifiers of TABLE 1 and rounding this value to 75%, a decay modifier of 0.8 can be chosen. The decay modifier of 0.8 can now be applied against the natural decay over this interval resulting in an interval decay value as follows:

$$(\text{Natural Decay} * \text{Interval Modifier})$$

$$(1000 * 0.8) = 800$$

The interval decay value can then be subtracted from the current decay value of the resource, which for the first interval will be the initial decay value:

Initial Decay Value−Interval Decay Value 10,000.00−800=9,200.00

So for this 30 minute interval, the asset decay value has been modified by 800 and the asset decay value is updated or otherwise adjusted to 9,200.00. This process can repeat until the decay reclamation value or threshold has been reached. Once that value has been reached, the lease duration can be considered completed, and the resource can be returned to an available state for use by other requestors.

Referring additionally to FIG. 3, lease duration results are shown for the above utilization example with the requested lease duration of 5 hours. The natural decay is shown, which reaches zero in between the 4.5 and 5 hour interval. For this resource, the lease duration has been extended because the 75% utilization metric requires use of the 0.8 decay modifier as described above. The lease duration reaches a zero or threshold value between the 6 and 6.5 hour interval resulting in this more heavily-utilized resource receiving an additional 1.5 hours on its lease duration time as a reward for high utilization. Had the utilization been lower, such as resulting in the use of the modifier of 1.2, then the lease duration would have reached the zero or threshold value prior to the 5.0 hour interval resulting in a lightly-utilized resource receiving less than the requested 5.0 hours on its lease duration time as a penalty for low utilization.

In another example, the method 200 can be utilized for extending lease durations, such as to drive up utilization when the utilization metrics are monitored and applied to the natural decay, without reducing requested lease duration. For instance, a requestor 100 for a resource 20 can be provided with the resource for at least the lease duration but, depending upon the utilization or other metrics being monitored and applied to the natural decay, the lease duration can be extended. While the exemplary embodiment of the method 200 describes choosing static modifiers and applying one of those modifiers for determining the lease duration, the present disclosure also contemplates the use of dynamic modifiers and/or the application of more than one modifier to the natural decay of the resource for determining the lease duration. For example, a group of modifiers can be established for each of the metrics that are to be utilized in determining the lease duration. One modifier from each of the groups of modifiers can then be chosen based upon the monitored metrics for the resource and each of the chosen modifiers can then be applied to the natural decay. In another example, the modifiers can be adjusted or replaced during the steps of the method 200. For instance, achieving utilization goals over a first portion of the lease duration may result in the modifiers being adjusted over a second portion of the lease duration that can result in an even longer extension of the lease duration, such as to provide additional incentive for high utilization of the resource.

The difference between the actual lease and the requested lease can depend upon a number of factors, such as how aggressive the interval modifiers are and how well the resource is utilized. A highly-utilized resource can have its lease duration extended, such as in order to complete the tasks that are being performed thereon without interruption. A poorly-utilized resource can have its lease shortened in order to reclaim that resource back for other provisioning.

The exemplary embodiments of the method 200 are described above with respect to a single resource 20 being leased. The present disclosure also contemplates the method 200 determining a lease duration for a group of the resources 20 that can be provisioned from one or more pools 30. The provisioning manager 50 or other system or device can query or otherwise obtain the metrics associated with each of the resources 20 from the group in order to determine the lease duration according to the method 200. In another embodiment, only a portion of the resources 20 of the group can be monitored for the metrics, and the steps of the method 200 can applied to that portion of the group metrics to determine the lease for the entire group.

The present disclosure also contemplates one or more steps of the method 200 being performed in a different order. For example, the determination of the natural decay can be performed prior to determining the metric average. In one embodiment, information associated with the request for resources can be used to establish one or both of the initial decay value and the decay interval.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product. The computer program product can comprise a computer-readable storage medium in which is embedded a computer program comprising computer-executable code for directing a computing device or computer-based system to perform the various procedures, processes and methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A method of provisioning resources in an on-demand computing system, the method comprising:
   obtaining a request for a resource from a requestor;
   provisioning the resource via a lease granted to the requestor, the lease specifying a lease duration based on an decay value and an initial value for a decay rate value;
   during a decay interval less than the lease duration, monitoring metrics associated with at least a utilization of the resource by the requestor;
   determining a lease modifier based at least in part on at least one of the metrics, the lease modifier comprising at least a function for computing an updated value for the decay rate value based at least on the utilization and the initial value for the decay rate value; and
   after the decay interval has elapsed and prior to an end of the lease, adjusting the lease duration for the resource by reducing the decay value by a current value of the decay rate value to yield an updated lease duration.

2. The method of claim 1, wherein the request specifies a requested duration for the lease, wherein the lease duration specified in the lease is greater than or equal to the requested duration, and wherein the adjusting of the lease duration does not decrease the lease duration below the requested duration.

3. The method of claim 1, further comprising:
averaging the at least one of the metrics over the decay interval to determine metric averages; and
determining the lease modifier based at least in part on the metric averages.

4. The method of claim 1, wherein monitoring the metrics further comprises a querying of the resource by a provisioning manager that received the request for the resource.

5. The method of claim 1, wherein the request for the resource is received by a provisioning manager, and wherein the monitoring of the metrics is performed by a metric capture tool installed on the resource.

6. The method of claim 1, wherein only a portion of the monitored metrics are used to determine the lease modifier.

7. A system having a processor for providing on-demand computing to a requester, the system comprising:
one or more resources having a metric capturing tool; and
a provisioning manager in communication with the one or more resources, wherein the provisioning manager receives a request for at least one resource from the requester,
wherein the provisioning manager provisions, via a lease granted to the requestor, the at least one resource from the one or more resources, the lease specifying a lease duration based on a decay value and an initial value for a decay rate value,
wherein the metric capturing tool communicates at least one metric from a plurality of metrics associated with at least a utilization of the at least one resource, by the requestor, to the provisioning manager during a decay interval less than the lease duration,
wherein the provisioning manager determines a lease modifier based at least in part on the at least one metric, the lease modifier comprising at least a function for computing an updated value for the decay rate value based at least on the utilization and the initial value for the decay rate value, and
wherein the provisioning manager adjusts, after the decay interval has elapsed and prior to the end of the lease, the lease duration for the at least one resource by reducing the decay value by a current value of the decay rate value to yield an updated lease duration.

8. The system of claim 7, wherein the one or more resources are a plurality of resources, wherein the provisioned at least one resource is a group of resources, and wherein the lease duration is for the group of resources.

9. The system of claim 7, wherein the request specifies a requested duration for the lease, wherein the lease duration specified in the lease is greater than or equal to the requested lease duration, and wherein the adjusting of the lease duration does not decrease the lease duration below the requested duration.

10. The system of claim 7, wherein the provisioning manager obtains a decay interval for the at least one resource, averages the at least one metric over the decay interval to determine metric averages, and determines the lease modifier based at least in part on the metric averages.

11. The system of claim 7, wherein only a portion of the monitored metrics are used to determine the lease modifier.

12. A non-transitory computer-readable storage medium in which computer-executable code is stored, the computer-executable code configured to cause a computing device in which the computer-readable storage medium is loaded to execute the steps of:
obtaining a request for a resource from a requestor;
during a decay interval less than the lease duration, monitoring metrics associated with the resource after the resource is provisioned via a lease granted to the requestor, the lease specifying a lease duration based on a decay value and an initial value for a decay rate value, the metrics associated with at least a utilization of the resource by the requestor;
averaging at least one of the metrics over the decay interval to determine metric averages;
determining a lease modifier based at least in part on the metric averages, the lease modifier comprising at least a function for computing an updated value for the decay rate value based at least on the utilization and the initial value for the decay rate value;
after the decay interval has elapsed and prior to an end of the lease, adjusting the lease duration for the resource by reducing the decay value by a current value of the decay rate value to yield an updated lease duration.

13. The computer-readable storage medium of claim 12, further comprising computer-executable code for causing the computing device to retrieve the metrics by querying a metric capture tool of the resource.

14. The computer-readable storage medium of claim 12, wherein the request specifies a requested duration for the lease, wherein the lease duration specified in the lease is greater than or equal to the requested duration, and wherein the adjusting of the lease duration does not decrease the lease duration below the requested duration.

15. The computer-readable storage medium of claim 12, wherein only a portion of the monitored metrics are used to determine the lease modifier.

16. The method of claim 1, wherein the function increases the decay rate value when the utilization is lower than a utilization goal, wherein the function decreases the decay rate value when the utilization is greater than the utilization goal.

17. The method of claim 16, wherein the adjustment of the decay rate value by the function is commensurate with the utilization.

18. The method of claim 1, repeating the steps of monitoring, determining, and adjusting until the lease duration has elapsed.

* * * * *